June 15, 1948. J. L. BRACK 2,443,552
VEHICLE BED ARRANGEMENT
Filed March 31, 1943 7 Sheets-Sheet 1
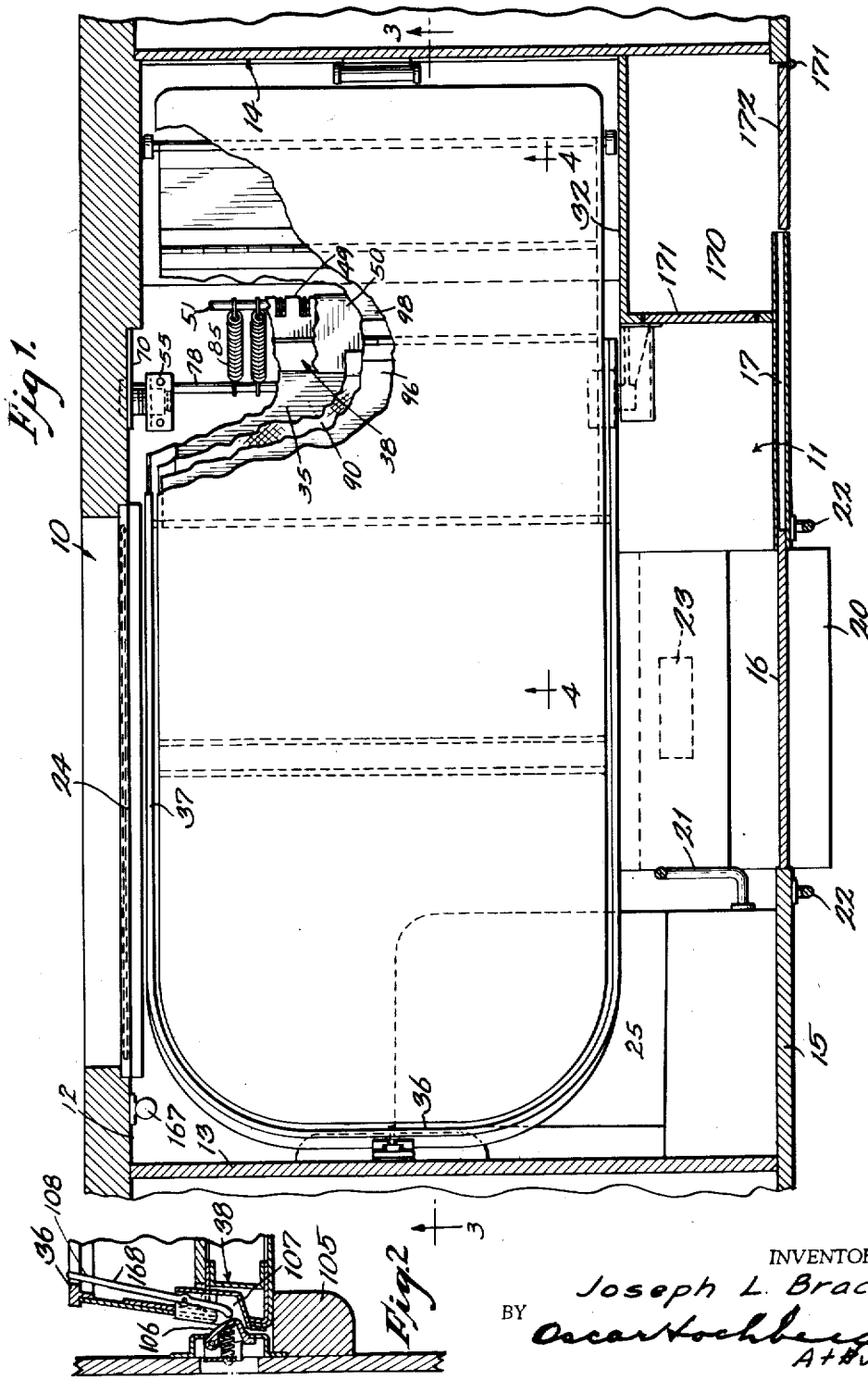
INVENTOR.
Joseph L. Brack
BY Oscar Hochberg
Atty.

June 15, 1948.　　　　　　J. L. BRACK　　　　　　2,443,552
VEHICLE BED ARRANGEMENT
Filed March 31, 1943　　　　　　　　　　　　　　7 Sheets-Sheet 2
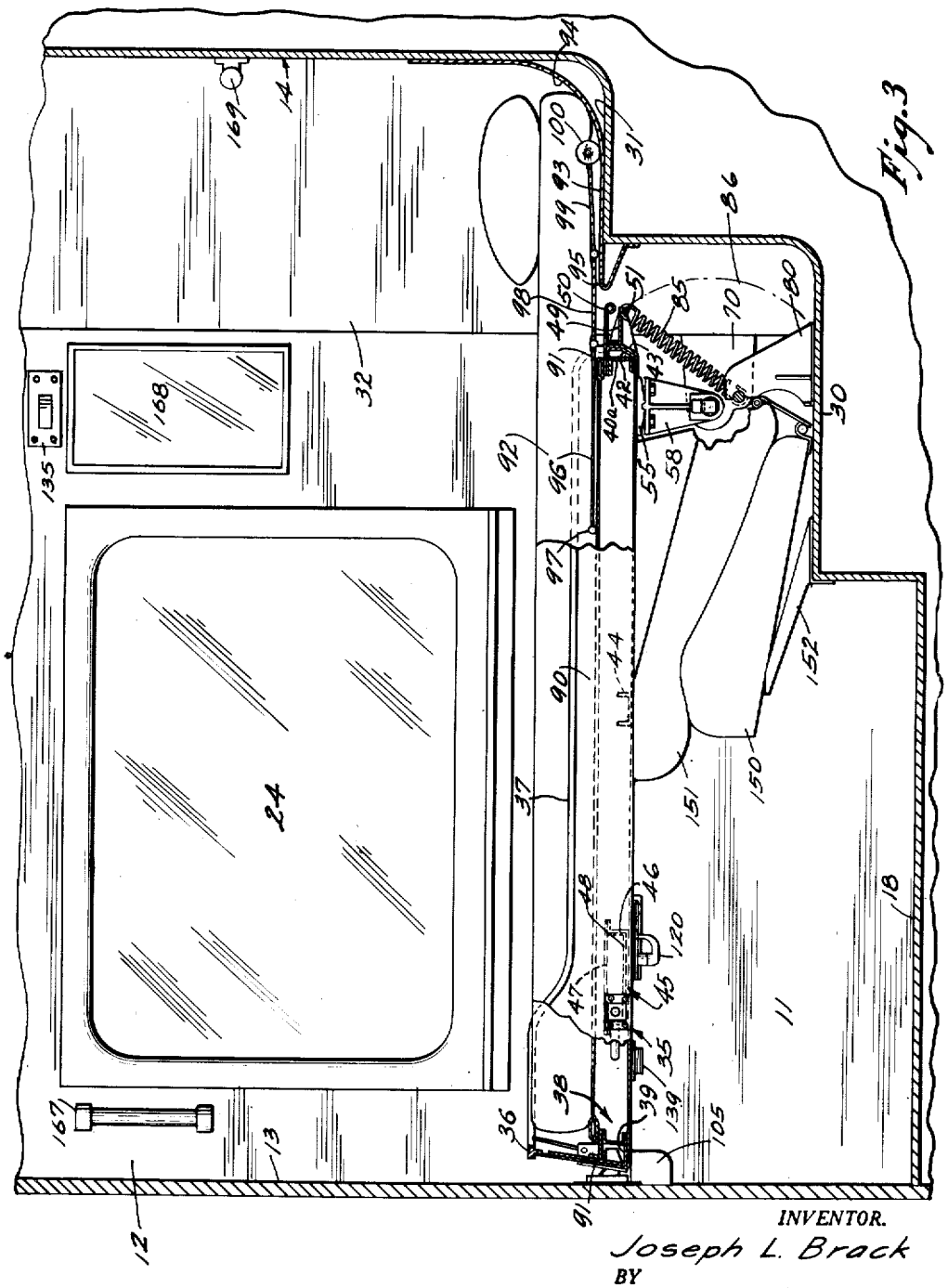
INVENTOR.
Joseph L. Brack
BY
Oscar Hochberg
Atty.

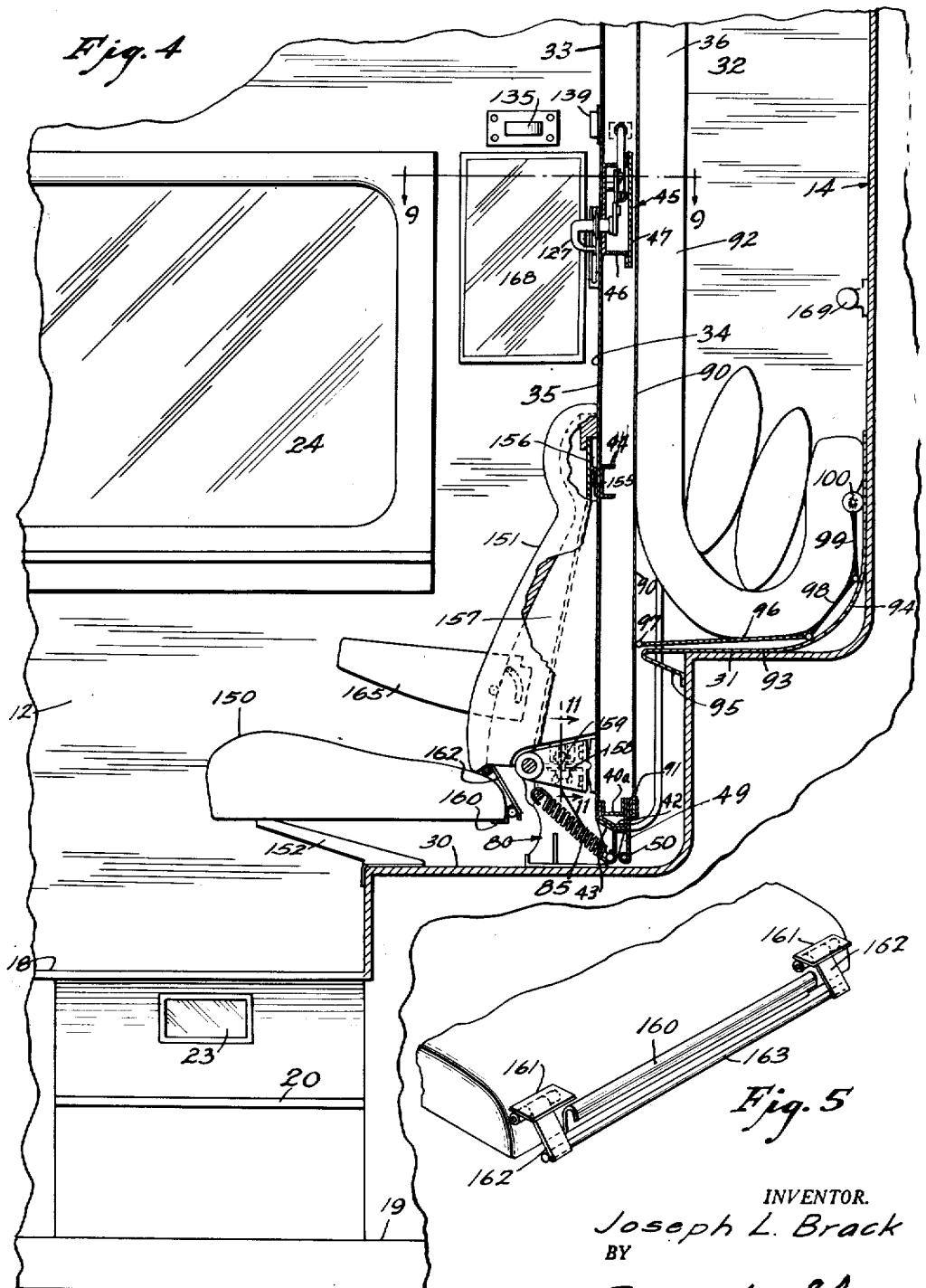

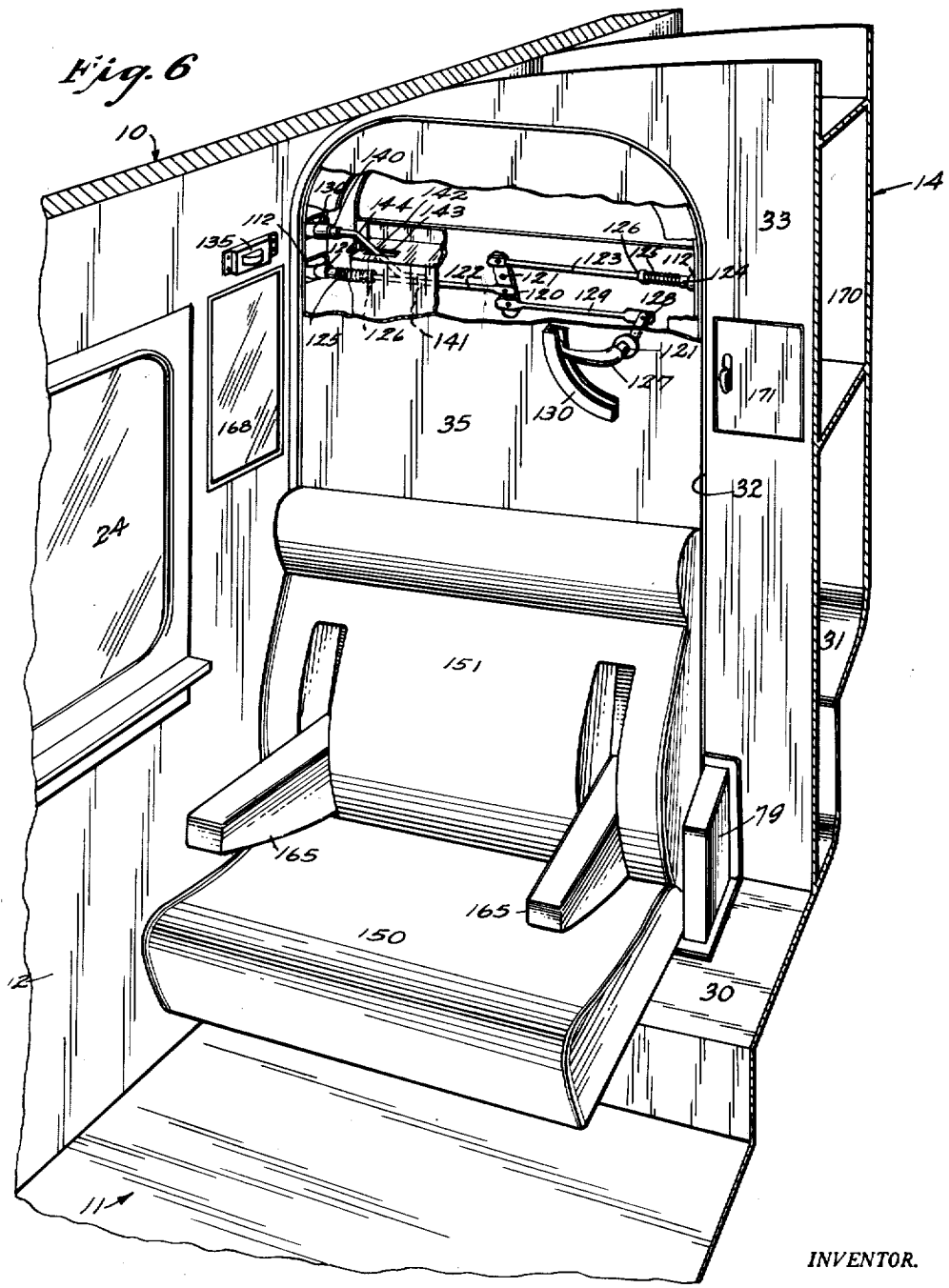

June 15, 1948.  J. L. BRACK  2,443,552
VEHICLE BED ARRANGEMENT
Filed March 31, 1943  7 Sheets-Sheet 5

INVENTOR.
Joseph L. Brack
BY
Oscar Hochberg
Atty.

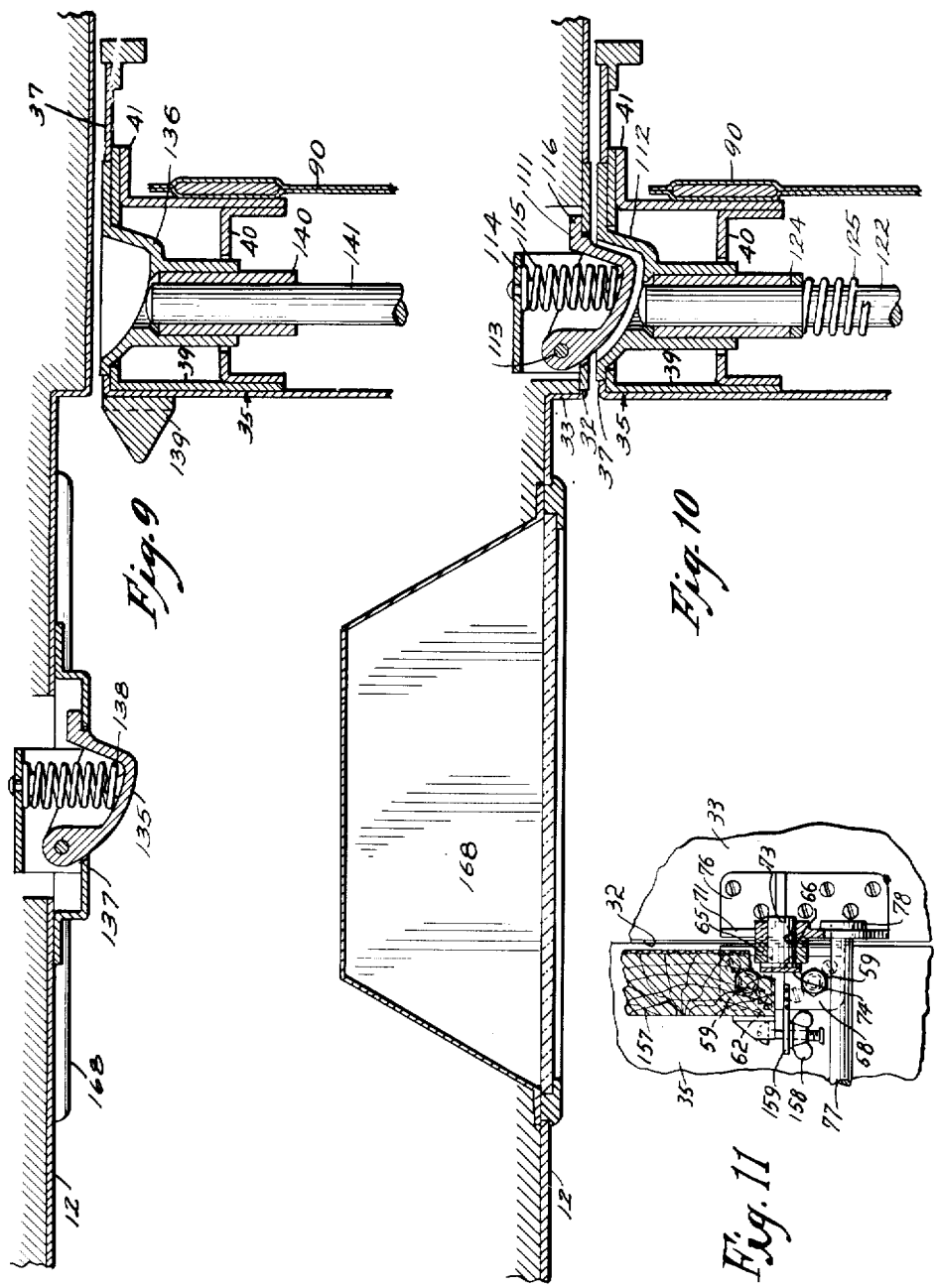

Patented June 15, 1948

2,443,552

UNITED STATES PATENT OFFICE 2,443,552

VEHICLE BED ARRANGEMENT

Joseph L. Brack, Chicago, Ill., assignor to Pullman-Standard Car Manufacturing Company, Chicago, Ill., a corporation of Delaware Application March 31, 1943, Serial No. 481,258

5 Claims. (Cl. 5—136)

1

This invention relates to railway sleeping cars and has for its primary purpose the provision of a folding bed of a type having a section of less than full bed length adapted to be folded flush within a wall and having an extension articulated therewith adapted to provide a full length bed extending into the wall when the bed is extended for use.

The principal object of the invention is to provide mechanism for mounting a bed within a recess whereby the bed may be adjusted for alignment with the recess and proper clearances afforded between the bed and recess. The invention contemplates individually adjustable mounting bracket members at each side of the bed.

The foregoing and other objects of the invention are attained by the construction and arrangement shown in the accompanying drawings in which:

Fig. 1 is a general plan view of a railway car room equipped with a folding bed arrangement of the type contemplated by this invention and showing the bed in extended horizontal position with portions broken away better to reveal the details of the mounting and counterbalancing arrangements for the bed;

Fig. 2 is a fragmentary detail sectional view of a hold-down device for holding the bed in extended position;

Fig. 3 is a longitudinal sectional view through the room taken on line 3—3 of Fig. 1 showing the bed in horizontal position and indicating the relative positions of the bed mounting brackets and counterbalancing springs and the connection between the seat cushion and backrest;

Fig. 4 is also a longitudinal sectional view but taken through the bed in its vertical retracted position taken on the line 4—4 of Fig. 1 and showing the relative positions of the adjustable bed mounting and counterbalancing parts in this position of the bed and also showing a sectional illustration of the bed locking mechanism;

Fig. 5 is an exploded perspective view of the related parts of the mechanism separably connecting the backrest and seat cushion of the seat showing the parts for association with the seat cushion and backrest respectively separated, but in relative position for assembly;

Fig. 6 is a general perspective view of the bed and seat arrangement with the bed in vertical retracted position and the seat disposed for use and having portions of the bed broken away to reveal the locking and safety catch mechanism;

Fig. 9 is a horizontal detail sectional view through the safety catch device and the cooperative part on the bed taken on the line 9—9 of Fig. 4 illustrating the relation of the parts in the fully retracted position of the bed and showing the plunger rod for releasing the safety catch when lowering the bed to extended position;

Fig. 10 is a horizontal detail sectional view through the locking latch arrangement for retaining the bed in fully closed position; and Fig. 11 is a fragmentary sectional view taken on the line 11—11 of Fig. 4 and showing the pivoted wing nut and bolt assembly for removably securing the seat backrest to the folding bed by attachment to the bed pivot brackets.

Figure 7:
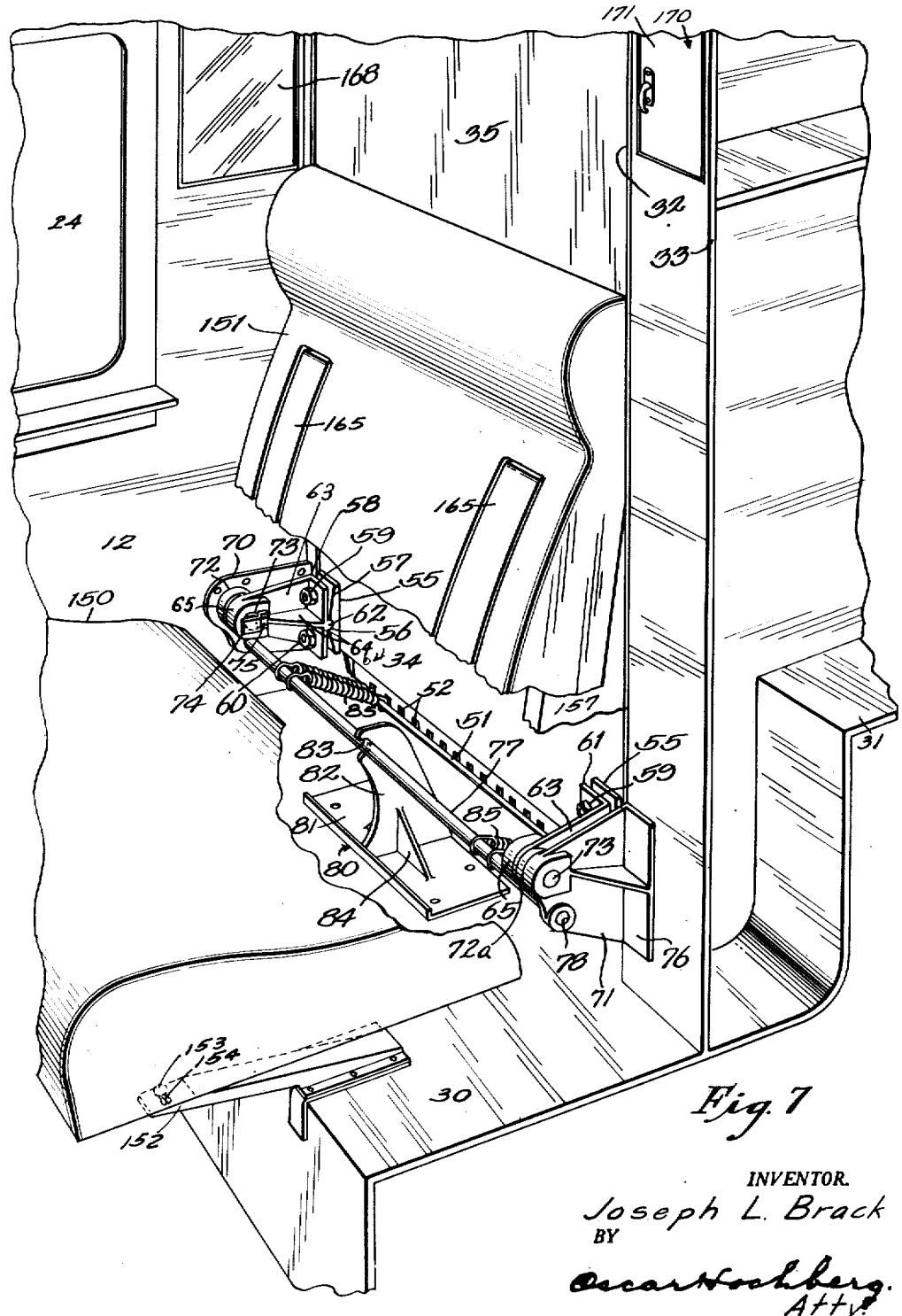
Fig. 7 is an enlarged detail perspective view of the adjustable bed mounting brackets and counterbalancing arrangement with portions of the seat broken away to show the mechanisms in detail.

In the drawings 10 represents a railway car having a room 11 defined by side wall 12, cross partitions 13 and 14 and aisle partition 15 which is provided with a door 16 receivable in pocket 17 when opened. The partition 13 separates the room from an adjoining similar room on the same level which is disposed in opposite relation to the room shown and the partition 14 separates the room 11 from an adjoining room on a lower level. As shown, the floor 18 of the room 11 is disposed at a level higher than that of the car floor 19 and is reached from the aisle of the car by means of stairs 20 in the doorway to the room. Handholds 21 and 22, the former disposed upon the inner side of the doorway and the latter comprising a pair of handrails disposed on the aisle side at opposite sides of the doorway, are arranged for the assistance of persons entering the room. A light 23 disposed in the riser of the uppermost step in the doorway illuminates the stairway for easy entrance and exit. A window 24 in the side wall 12 is disposed opposite the doorway to the room. A combination member 25 including a folding washbasin and a hopper member is disposed in a corner of the room by the aisle partition at one side of the doorway for the convenience of the occupant of the room.

The partition 14 is constructed with offset portions 30 and 31 and is relatively deep in a direction normal to the plane of the partition to provide a recess or alcove 32 opening into the room for the reception of a folding bed and bedding hereinafter to be described and at that side facing in the room 11 is provided with a plane surface 33 about the bed alcove and with which the bed is adapted to fit flush. The bed 35 includes a hingedly mounted portion 35 of a fixed length extending substantially from the offset 30 to the top of the bed alcove 32 and comprises a box like structure having a bottom closing wall 34, an end footboard member 36 continuously curved around the corners of the bed and integral with continuous side rail members 37 which are of reduced height with respect to the end rail, as indicated in Fig. 3, and extend along both sides of the bed. A built up box section frame structure 38 extends entirely around the bed to provide the rigidity necessary to strengthen the bed against distortion in service. At the footboard end of the bed and along the two sides thereof the frame is comprised of an angle member 39, a channel shaped member 40 and a second angle member 41. The angle member 39 is seated directly against the bottom wall 34 and is bent to correspond to the curvature of the corners of the box-like structure at the end footboard and has a flange portion secured to the respective side rails. The second angle member 41 is continuous with the member 39 along the side rails and across the end footboard and is secured to those flange portions of the first angle member bearing against the end and side rails, with its inwardly projecting flange in spaced parallel relation to that flange of the angle 39 secured to the bottom wall 34, and having a channel shaped member 40 continuous with the members 39 and 41 disposed between such parallel flanges to provide a fully closed box section, integrally secured by welding. At the hinged edge of the bed the side rail portions of the frame are connected by a box section reinforcing structure composed of a channel member 42 having inwardly directed spaced flanges between which a channel member 40ª is disposed and both of which with that end of the bottom wall 34 are adapted to fit into an outside channel shaped member 43 extending across the width of the bed.

The bed frame is further reinforced intermediate the length of the bed by means of a channel member 44 extending between and connecting the side rail portions of the frame with its web secured to the bottom wall 34 and by a box section structure 45 also extending between the side rail portions of the frame and comprised of a flanged channel member 46 secured with its web against the bottom wall 34 and having a closing plate 47 extending across its flanges to complete the box section. A reinforcing channel shaped plate 48 is nested within the flanged channel 46 at the center of the bed. At the hinge end of the bed an extension plate 50 of the full width of the bed between the side rails 37 is secured to the reinforcing frame member 43 and is provided with a rolled free edge. At this same end of the bed an angle bracket 49 is also secured to the frame member 43 and has its projecting flange extending in the direction of the length of the bed and slotted at regular intervals across the width of the bed as at 52 for a purpose hereinafter to appear. A rod 51 traverses the open ends of all of the slots 52 across the full extent of the angle member. All of the bed construction thus far described comprises an integrated arrangement of parts secured by welding to provide a unitary structure.

Adjacent the lowermost or hinged edge of the bed a rocker plate 55 is secured to the outside face of the bottom wall 34 in line with the reinforcing frame structure at each side of the bed by means of countersunk machine screws. Each rocker plate is provided with a transversely disposed concave rocker bearing 56 intermediate its length with inclined surfaces 57 extending from opposite sides of the bearing downwardly toward the respective ends of the plate. An adjustable pivot mounting bracket member 58 is rockably secured to each rocking plate by means of upper and lower machine bolts 59 and 60 respectively. The brackets 58 each include a base plate 61 having a transversely disposed outwardly directed convex bearing 62 adapted cooperatively to engage the bearing 56 in the rocker plate, and integral with the base plate 61 of each pivot bracket is an outwardly extended arm portion 63 strengthened by a reinforcing web 64 and terminating in an enlarged head portion 65 which is provided with a pivot pin bearing opening for the reception of a pivot mounting pin. By means of the rocker bearing arrangement 56—62 the brackets 58 are adapted to be adjusted by drawing up one of the bolts 59 or 60 while withdrawing the other to change the relation of the base plate 61 with respect to the inclined surfaces 57 whereby to effect a raising or lowering of the free end of the brackets as desired. The bracket assembly is duplicated at opposite sides of the bed and it will be seen that by adjustment of the upper and lower machine bolts 59 and 60 the position of the respective brackets may be varied to raise one and lower the other or raise or lower both whereby to vary the position of the bed 35 vertically or angularly with respect to its supports for positioning the bed in the alcove 32 with proper clearance around all sides to prevent binding and insure easy operation of the bed in service.

Fixed mounting brackets 70 and 71 are disposed at opposite sides of the bed in position to cooperate with brackets 58 in the pivotal support of the bed. Bracket 70 comprises a flat plate secured to the side wall 12 of the car by means of countersunk machine screws, as shown in Fig. 7, and having an enlarged bearing area 72 for the reception of pivot pin 73 extending through the enlarged head 65 of bracket 58 into the bearing 72 for supporting the bed. The pivot pin is inserted from the inner side of bracket 58 with the head of the pin limiting inward movement thereof and is held in place by means of a retainer plate 74 secured to the enlarged head of the bracket 58 in overlapping relation to the head of the pin by means of round head machine screws 75 whereby to insure operative engagement of the parts at all times. The bracket 71 is similar to the wall bracket 70 but is provided with a base flange 76 for attachment to the plane surface 33 at the opposite side of the bed alcove in position to cooperate with the other pivot bracket 58 at that side of the bed and is provided with an enlarged bearing 72ª for the reception of a pivot pin 73 which is received and maintained in exactly the same manner as in bracket 70. The bracket 71 projecting from the plane surface 33 at one side of the bed is concealed by means of a flanged cover 79 secured to the offset 30 and to the surface 33 and completely covering the bracket, as best shown in Fig. 6. The two brackets 70 and 71 are connected by means of a rod 77 extending between and secured in the respective brackets, as at 78. This rod is supported and braced intermediate its length between the brackets 70 and 71 by means of a center reinforcing bracket structure 80 which is comprised of a built up construction including a base plate 81 for attachment to the offset 30 and having the upstanding bracket 82, which is slotted at 83 for reception of the rod 77, secured in the center of the base plate by welding and braced by gussets 84. It will be seen that the bracket structure 80, disposed rearwardly of the rod 77 with the slot 83 engaging the rod 77 opening forwardly, serves to brace the rod against deflection in three directions—rearwardly and both upwardly and downwardly. Thus braced, the rod 77 serves as a very rigid anchorage for counterbalance springs 85 which are disposed in pairs at each side of the bed and extend between the rod 77 and rod 51 with which they are engaged through the slots 52 in angle member 49 and which it will be seen serve to maintain the springs in proper spaced relation laterally. With the anchorage 77 disposed beneath the pivot point 73 for the bed and the springs attached to the bed at that same side of the pivot whereby to resist pivotal movement of the bed in a direction out of the alcove 32, the springs will be stretched from the normal position indicated in Fig. 4, with the bed vertical and retracted within the alcove 32, to the fully extended condition illustrated in Fig. 3 with the bed horizontal for use and during which action the springs move in the orbit 86 as they are stretched. It will be noted that the counter-balancing arrangement thus provided is accommodated in an absolute minimum of space without encroaching upon space otherwise used and which exerts a maximum restraining action on the bed to provide an efficient counterpoise easing the opening and closing movements of the bed and the resistance of which may be varied and controlled by the number of springs used to balance the bed, which may be any number up to the capacity of the angle bracket 49 as determined by the number of slots 52 for accommodation of the springs on the rod 51. As shown, the springs 85 are used in groups of two at each side of the bed, which have been found to just balance the weight of the bed and bedding so that the bed may be operated between its two extreme positions with a minimum of effort. When the bed is disposed in inoperative position vertically within the alcove 32, the springs 85, as best shown in Fig. 4, incline upwardly from their connection with the bed at 51 to the anchorage 77, whereby to exert an upwardly directed steady pull on the bed, thus to relieve the adjustable pivot brackets 58 of a portion of the weight of the bed and as a result of which a portion of such weight is distributed to the center bracket structure 80 as well as the supporting brackets 70 and 71 at the respective sides. Since the forces and reactions of the springs 85 between the rods 51 and 77 are always exerted within the segment defined by the springs as they move through the arc 86, the center bracket structure 80, with the upright plate 82 having the anchorage rod 77 engaged within the slot 83, will resist forces exerted on the rod 77 in all of the directions of application of such forces by the springs as the bed is manipulated. The bracket 80 resists downward deflection of the anchorage 77 as the springs 85 exert such a force thereon in the support of the bed when it is vertically inoperative and rearward and upward deflections exerted by the further stretching of the springs as the bed moves from inoperative position to horizontal operative position and vice versa.

In order resiliently to support a mattress, the bed is provided with a flexible mattress supporting member 90 which, in the form shown, comprises a flexible and resilient membrane secured over a rigidifying frame 91 which is secured to the upper surface of the bed frame structure 38 at all four sides of the bed with the mattress supporting member 90 supported in spaced relation to the bottom wall 34 of the bed. While this particular manner of resiliently supporting the mattress is shown and described, other constructions and arrangements may be resorted to for supporting the mattress if desired. The mattress supporting member 90 is disposed in the folding bed 35 and the location of the pivot 73 for the bed is such that the mattress support, when the bed is horizontal, is disposed on a plane with the offset 31 which is adapted to provide a continuation of the bed 35 in that it supports the end of the mattress disposed thereon. As shown in Fig. 4, a mattress 92 is folded in the bed alcove 32 and supported with the bedding on offset 31 when the bed is closed, but as the bed is lowered to the position shown in Fig. 3 the mattress assumes a horizontal position primarily supported on the flexible member 90 but partially supported on the offset 31, since the head end of the bed in the made-up position extends within the bed alcove. Thus a bed of less than full length, as defined by the hingedly mounted portion 35, is adapted to provide a full length bed in the open position. The offset 31 is covered with a plate 93 providing a curved incline 94 and having a projecting portion 95 extending beyond the offset to reduce the gap between the extension plate 50, on the bed, and the offset to a minimum. Thus the mattress 92 is supported substantially throughout its length. The mattress is folded automatically in the alcove 32 as the bed is moved from the horizontal position of use to the vertical closed position. A multipanel hinged plate structure 96 extending the full width of the bed is hingedly secured to the bed frame structure 38 at each side of the bed, as at 97, and includes a plurality of hingedly connected sections 98 and 99 having a pair of rollers 100 disposed one at each side of the free end of the hinged panel structure. In the horizontal position of the bed 35 this structure is adapted to bridge the gap between the extension plate 50 on the bed and the projection 95 on the offset 31 to support the mattress 92 and being beneath the mattress as the bed 35 is moved from horizontal position into the bed alcove will cause the mattress to fold, as shown in Fig. 4, as the rollers 100 ride up the incline 94 thus automatically adapting the mattress to the folded position of the bed and providing a coplanar extension of the mattress support in the open position of the bed whereby to accommodate a mattress of full bed length.

The bed, in its open horizontal position, is supported at its free end on a bed rest 105 secured to the partition 13 and is held in this position by a releasable locking device in the form of a spring pressed catch 106 located also in the partition 13 above the bed rest 105 in position to engage recess 107 in the end footboard 36 of the bed as the bed is lowered to final horizontal position. When it is desired to raise the bed the latch 106 may be released by means of a lever member 108 hingedly mounted on the bed in such manner as to have one end in the recess 107 which is adapted to engage the locking member 106 to press it out of the recess and hold it clear of the path of the bed when the other end of the lever, which is located between the mattress and footboard, is manipulated to release the bed.

The folding bed 35 is adapted to be locked in fully closed position by mechanism while is manually releasable when it is desired to open the bed for use. The mechanism for locking the bed comprises a pair of automatically operating spring pressed latches 111 mounted one in each side wall of the bed alcove 32 and so located as to engage keepers 112 in the respective side rails 37 of the bed. Each latch 111 is pivoted at 113 in a retainer member 114 which is secured in the side wall of the bed alcove. Spring 115 between the latch and retainer member urges the latch at all times in an outward direction automatically to engage the keeper 112 when the bed is pressed into the alcove. Stop 116 on the latch limits its outward movement. The latch 111 is so positioned in the bed alcove in regard to its pivotal action as to be retracted by the passage of the bed into the alcove and then to spring into the keeper 112 as the bed reaches final position to present a shoulder acting as a stop to prevent outward movement of the bed until the latch 111 is manually retracted by releasing mechanism actuated by the occupant of the room.

Figure 8:
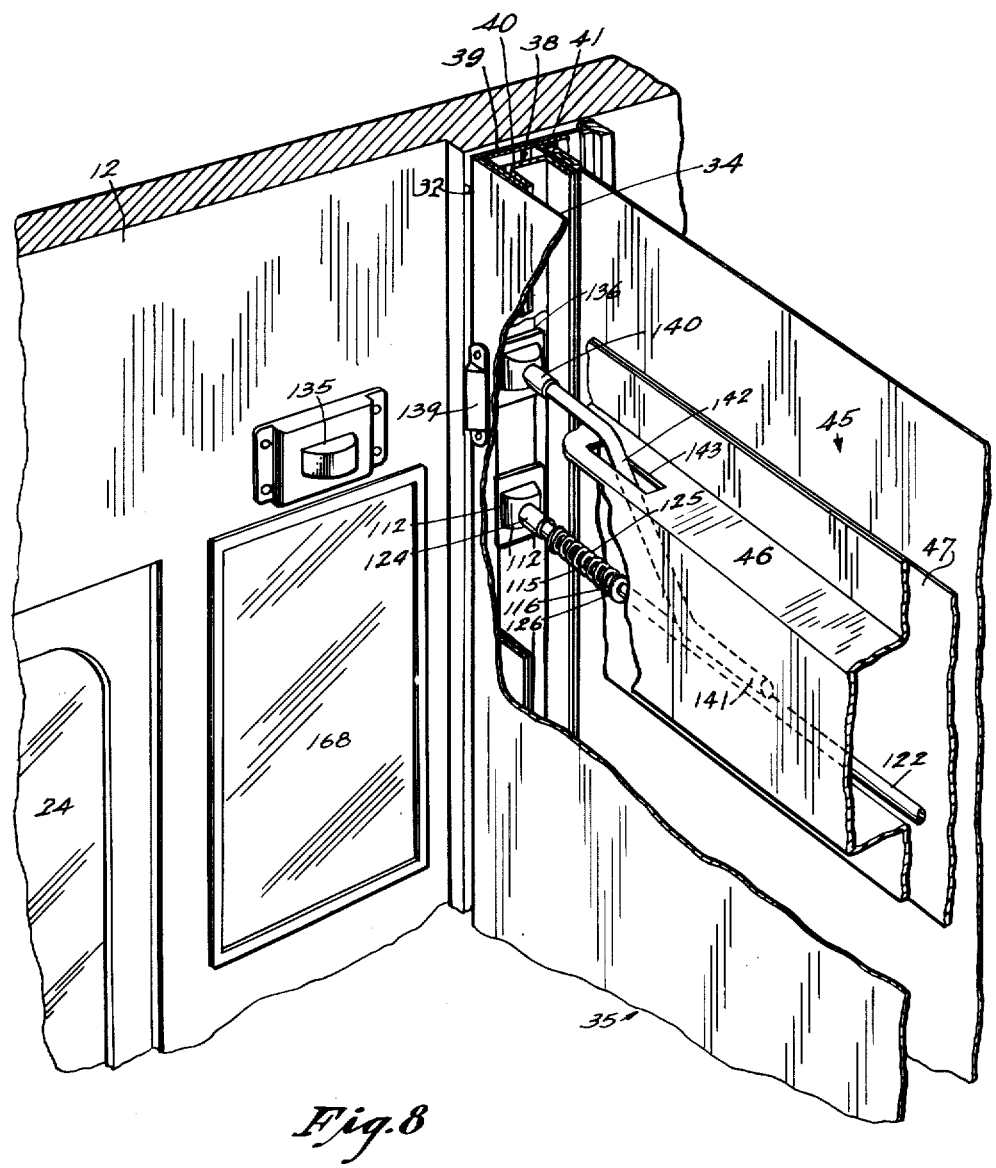
Fig. 8 is an enlarged detail perspective view of the bed locking mechanism and safety catch arrangement having parts broken away to disclose the structure and showing the safety catch on the side finish of the room.

The releasing mechanism for retracting the latches 111 is enclosed within the box structure 45 and is best illustrated in Figs. 4, 6, and 8. The mechanism includes a center fulcrum lever 120 pivotally mounted at 121 on a fixed pivot which is secured to the reinforcing channel plate 48 in the flanged channel 46. Latch release rods 122 and 123 are pivotally connected to the fulcrum lever 120 at opposite sides of the pivotal support 121 and extend in opposite directions through the box structure 45 across the bed to enter the respective keepers 112 in the side rails 37 of the bed. As best shown in Fig. 10, the respective latch rods 122 and 123 each pass through a bearing 124 mounted in the keepers 112 and through which they are adapted to reciprocate in the operation of releasing the latches 111. The rods 122 and 123 are each provided with a shoulder 126 against which a compression spring 125 is adapted to seat and which exerts a force against the respective bearings 124 and the keepers 112 normally to maintain the latch rods withdrawn from engagement with the latches 111. The latch rods are actuated by means of an operating handle 127 which is disposed on the face of the bed 35 in position to be grasped by a person manipulating the bed from within the room. The operating handle extends through the bottom wall 34 of the bed into the interior of the box 45 enclosing the latch releasing mechanism where it is provided with a lever arm 128 which is operatively connected with the lower extremity of the center fulcrum lever 120 by means of a strut 129 through the medium of which the latch releasing rods are actuated against the resistance of spring 125 from the handle 127.

With the bed 35 disposed vertical within the alcove 32 and locked by the engagement of latches 111 within keepers 112, latch rods 122 and 123 are normally retracted by action of springs 125 with the fulcrum lever 120 disposed at an angle to one side of the vertical, as shown in Fig. 6, with rod 123 connected thereto above the pivot 121 and rod 122 connected below the pivot. The lever arm 128, connected to the lower extremity of the fulcrum lever by strut 129, is disposed at an angle to the opposite side of the vertical from that of the fulcrum lever, with the operating handle 127 disposed horizontally at the opposite side of its pivot point from the direction of inclination of the lever arm and between such pivot point and the connection of the lever 128 to the fulcrum by the strut 129. When it is desired to withdraw the bed from the alcove the operator grasps the handle 127 and rotates it contraclockwise (in the embodiment illustrated) approximately sixty-eight degrees, which action, by means of the lever arm 128 and connection 129, rotates the fulcrum lever 120 clockwise to thrust the rods 122 and 123 in opposite directions into the respective keepers and thereby engage the latches 111 and press them from engagement with the keepers 112 until the keepers pass the latches after which the springs 125 will return the entire mechanism to normal when the handle 127 is released and after the bed has passed, springs 115 will return latches 111 to normally extended position. By the opposite inclination of the levers 120 and 128 an operating stroke of maximum length may be obtained fully to retract the latches 111 in all circumstances without any binding between the various parts of the mechanism. The operating handle 127 in addition to actuating the release mechanism is utilized also to pull the bed out of the alcove and in order to prevent any possible distortion, is provided with a guide 130 for the free end of the handle, which is adapted to operate through a track in the guide during actuation of the releasing mechanism. The guide is secured to the face of the bed 35 and comprises a segment of a circle so located as to include the full operating range of the handle. When the bed is pushed fully into the alcove 32, the latches 111, under influence of springs 115, will automatically engage the keepers 112 to retain the bed in retracted position.

In the type of railway car room in which the bed of this invention is adapted to be used, it is customary for the occupants of the various rooms, upon arising, to release the hold down device 108 and push the bed 35 into the alcove 32 in order to proceed about the preparation of their toilet, but sometimes due to disarrangement of the bedding, the bed is prevented from entering the alcove to such extent as to be retained by the latches 111, which, if not engaged in the keepers 112, leave the bed free to move towards the fully open position. In order to prevent the bed, under such circumstances, from being thrown toward open position suddenly by reason of jarring impacts arising from operation of the car in a train, a safety catch is provided which is adapted to prevent the bed from moving any further than an intermediate position without continued or repeated manipulation of the bed operating handle 127.

As best shown in Figs. 6, 8, and 9, an intermediate safety catch 135 is located upon the side wall 12 of the car in position to engage a keeper 136 disposed in the side rail 37 of the bed as the bed moves out of the alcove 32. The safety catch is similar in operation to the locking latch 111 and is mounted in a housing 137 which is secured upon the side wall 12 but otherwise functions exactly like the locking latch with a spring 138 for urging the catch outwardly, automatically to engage the keeper 136 as the bed moves to a position where the keeper is aligned with the safety catch whereby to prevent further movement of the bed toward open position. The safety catch is at all times normally disposed within the path of the bed under influence of spring 138, as best illustrated in Fig. 9, so that in order to get the face of the bed past the shoulder presented by the catch, it is necessary to provide an inclined strike plate 139 on the face of the bed in a position to engage the safety catch on its inclined surface as the bed is opened to press the catch out of the way when the bed approaches the point of engagement therewith. When the bed reaches a point where the keeper 136 in the side rail thereof coincides with the catch member, the latter member enters the keeper under pressure of spring 138 thereby positively to prevent further opening movement of the bed. The catch 135 is disposed upon the side wall 12 at a point sufficiently removed from the fully closed position of the bed to enable anyone operating the bed to push the bed at least this far in the closing movement in spite of any binding action caused by disarranged bedding and is located in the path of the arc described by the keeper 136 so that when the bed is pushed to the intermediate position or beyond, the catch is automatically operable.

When it is desired to open the bed 35 for use the safety catch 135 may be prevented from entering the keeper 136 whereby to enable the bed to pass the catch without pause, in moving to the horizontal position shown in Fig. 3. The keeper 136 is exactly like the keepers 112 and has a bearing 140 through which a release rod 141 for the safety catch reciprocates and which is adapted to be extended through the keeper to retract the catch 135 in the same manner as the latch rods 122 and 123 are used to release the latches 111. The rod 141, together with the keeper 136, as best shown in Fig. 8, is disposed above the level of the box structure 45 enclosing the release mechanism for the latches 111, but is inclined downwardly at 142 and passes through an opening 143 in the upper wall of the box to engage the latch rod 122 with which it is integrally connected at 144 by welding. The rod 141 therefore operates simultaneously with and is projected and retracted by the latch release rod 122, with rod 123, from the operating handle 127 and is adapted to enter the keeper 136 when the handle 127 is manipulated to project the rods 122 and 123 into the keepers 112 for releasing the latches 112 and with the rod 141 thus blocking the keeper 136. If the operating handle is held in release position until the bed passes the safety catch 135, the catch will be prevented from entering the keeper wherefore the bed may traverse its full opening movement without interruption. Should the bed be in the intermediate position with the catch 135 engaged in the keeper and it is desired to move the bed to full open position, it is only necessary to operate the handle 127 to project the rod 141 which presses the catch out of engagement and allows the bed to pass. If the handle 127, after actuation to release latches 111, is returned to normal position before the bed passes the catch 135, it will be necessary to repeat the operation of the handle to release the safety catch. While the safety catch has been illustrated and described for actuation by an auxiliary rod 141, it is entirely possible, where framing conditions of the car side frame and side finish arrangements permit, for the safety catch to be so located on the side wall 12 as to be engageable with the keeper 112 at that side of the bed and releasable by the latch rod 122.

A seat and folding backrest arrangement 150 and 151 is cooperatively associated with the folding bed 35 and is adapted automatically to be folded to an inoperative position when the bed is opened to operative position and returned to operative seating position when the bed is closed to its fully retracted position in the bed alcove 32, as shown in Figs. 3 and 4, respectively. The seat cushion 150 is supported from the offset 30 by means of brackets 152 with which the seat is removably associated by means of button head fastenings 153 on the respective brackets and transversely disposed keyhole slots 154 in the bottom surface of the seat cushion. The seat cushion is mounted on the brackets 152 by placing the large apertures of the keyhole slots 154 over the heads of the button type fastenings 153 and then shifting the seat transversely to bring the slot portions of the keyholes into engagement with the shank of the fastenings thereby to provide an interlocking connection to prevent separation of the seat from the supporting brackets, but which enables removal of the seat cushion in a very simple manner when desired. The backrest 151 is removably supported from the bed 35 by means of vertically separable brackets 155 and 156 on the bed and backrest respectively and which extend across a major portion of the width of the backrest. The backrest is provided with a vertical frame member 157 at each side, which is shaped to maintain the proper inclination of the backrest with respect to the bed and the backrest is rigidly secured to the bed at the lowermost portion of the backrest through the medium of these frame members by means of adjustable wing nut and bolt assemblies 158 pivotally attached to the lower extremity of the respective frame members 157 and removably engaged with slotted plates 159 welded to the gusset webs 64 on the brackets 58. Thus the backrest is fixed with respect to and moves with the bed 35 during all of its movements between open and closed positions but may be removed from the bed merely by releasing the wing nut and bolt assemblies from the brackets 58 and lifting the backrest to disengage the brackets 155 and 156. The pivotal attaching bolt and wing nut assemblies are best shown in Fig. 11.

The seat cushion 150 and backrest 151 are operatively connected for joint cooperation at all times to maintain the predetermined relation of the associated parts automatically when the room is prepared for day occupancy and which permits of the pivotal movements of the bed to horizontal position while providing for automatic restoration of the seat and backrest to their proper relation when the bed is moved to vertical position. In order to accomplish this function while providing for the ready removal and assembly of the seat cushion and backrest with respect to the bed 35 and offset 30, the seat 150 has been provided at its lowermost rear edge with a plate 160 secured to the bottom frame of the seat cushion and bent to provide an inverted hook shaped channel extending substantially across the width of the seat, as best illustrated in detail in Fig. 5. The inverted channel member 160 is adapted to cooperate with a supporting member on the backrest which is arranged to compensate for the relative movement between the seat and backrest as the bed is manipulated between its extremes of movement. The backrest at its lowermost forward edge portion is provided with a pair of hinge brackets 161 disposed in spaced relation, one at each side of the backrest, from which a pair of hinged plates 162 are pivotally suspended and which are connected together at their free edges by a continuous rod 163 to provide a hinged bail shaped member for cooperating with the inverted channel 160 in the support of the seat cushion. The connecting rod 163 between the suspension plate members 162, in the operative relation of the parts, is received in the inverted channel member whereby to support the rear portion of the seat cushion from the backrest in a manner to accommodate all relative movement between the parts during operation of the bed by the hinging action of the supporting bail. Sufficient clearance is provided at the connections 152 to accommodate the necessary relative movement as the seat moves from the position indicated in Fig. 4 to that shown in Fig. 3 and back during operation of the bed.

The seat and backrest may be disassembled by shifting the seat cushion laterally to bring the large apertures in the keyhole slots 154 in registry with the heads of the fastenings 153 whereupon the front edge of the seat may be lifted clear of the fastenings after which the rear edge may be raised to separate the inverted channel plate 160 from the supporting bail 163 and the seat then removed. After removal of the seat 150 access may be had to the wing nut assemblies 158 to release the lower portion of the backrest 151, after which the backrest may be lifted directly out of the supporting bracket 155. Assembly of the backrest and seat cushion is, of course, in directly reverse sequence.

Folding armrests 165 are provided in the backrest and which are adapted to be folded automatically into the backrest upon contact with the seat cushion 150 should they be allowed to remain extended when the bed 35 is moved to horizontal position. A wall light 168 flush with the surface of side wall 12 is provided alongside of the seat to provide illumination for reading and when the bed is made up for night use in the horizontal position, a light 169 in the bed alcove 32 is available as a bed light. Light 167, also on the side wall, provides additional general illumination.

A shoe locker 170 is provided in the partition 14 alongside of the bed alcove 32 having an access door 171 opening through the wall surface 33 into the room and having a door 172 affording access to the shoe locker from the aisle of the car.

From the foregoing it will be seen that a folding bed and seat arrangement for railway cars has been provided which affords readily adjustable mechanism for initially fitting the bed into an alcove and having means maintaining and restoring the operative relation of the seat arrangement during manipulation of the bed and in which counterbalancing mechanism for the bed is provided in a minimum of space without interfering in any way with the operation of the seat or encroaching upon the space which might better have been made use of for the bed or seat and wherein automatic locking mechanism is provided for the bed in combination with safety mechanism for preventing accidental displacement of the bed with means for manually releasing the locking mechanism and rendering the safety mechanism inoperative when operating the bed.

What is claimed is:

1. In a railway car having a room structure including a partition having a bed alcove therein, a bed arrangement for the room adapted for association with said alcove comprising a bed foldable endwise within the alcove substantially flush with the surface of said partition, means for pivotally mounting the bed for folding movements comprising a pair of mounting brackets secured respectively to a fixed member of said room structure at opposite sides of the alcove and a pair of brackets on the bed secured at respectively opposite sides thereof pivotally connected with the mounting brackets, said bed brackets each comprising a rocker plate rigidly secured on the face of the bed and a separate bracket member, said rocker plates each having oppositely inclined surfaces separated by a transversely extending concave bearing and said bracket members each having a complemental convex bearing engaging said concave bearing, and means secured through said base plate to the rocker plate at opposite sides of said bearings, said means being adjustable to vary the position of the base plate relative to said inclined surfaces and thereby change the relative angularity of the bracket members to raise or lower or change the angular position of said bed in the alcove.

2. In a railway car having a room structure including a partition having a bed alcove therein, a bed arrangement for the room adapted for association with said alcove comprising a bed foldable endwise within the alcove substantially flush with the surface of said partition, means for pivotally mounting the bed for folding movements comprising a pair of mounting brackets secured respectively to a fixed member of said room structure at opposite sides of the bed alcove and a pair of brackets on the bed secured at respectively opposite sides thereof pivotally connected with the mounting brackets, one of said pairs of brackets each comprising a rocker plate and a separate bracket member, said rocker plates each having oppositely inclined surfaces separated by a transversely extending concave bearing and said bracket members each having a base plate including a complemental convex bearing engaging said concave bearing, and means secured through said base plate to the rocker plate at opposite sides of said bearings, said means being adjustable to vary the position of the base plate relative to said inclined surfaces and thereby change the relative angularity of the bracket members to raise or lower or change the angular position of said bed in the alcove.

3. In a vehicle having a room structure including a partition having a bed alcove therein, a bed arrangement for the room including a bed foldable endwise to an upright position in said alcove, means for pivotally mounting the bed for folding movements with respect to the alcove comprising a pair of mounting brackets secured respectively to a fixed member of said room structure at opposite sides of the alcove and a pair of brackets secured respectively to the bed at opposite sides thereof and pivotally connected with the mounting brackets, one of said pairs of brackets each including a plate and a separate bracket member having a base complemental to said plate, said plates and said bases having oppositely receding surfaces therebetween to provide rocking surfaces for the respective bracket members, and means securing the respective bracket members to said plates, said means being adjustable to vary the angular position of the bracket members through the medium of said rocking surfaces to raise or lower the bracket members and thereby adjust the vertical position of the bed in said alcove.

4. In a vehicle having a room structure including a partition having a bed alcove therein, a bed arrangement for the room including a bed foldable endwise to an upright position in said alcove, means for pivotally mounting the bed for folding movements comprising a pair of mounting brackets secured respectively to a fixed member of said room structure at opposite sides of the alcove and a pair of brackets secured respectively to the bed at opposite sides thereof and pivotally connected with the mounting brackets, each of the brackets of one of said pairs including two parts having opposed rocker bearing surfaces providing for relative adjustment therebetween whereby to vary the angular position of the brackets and thereby adjust the vertical position of the bed in said alcove, and adjustable means securing together the said two parts of said last-named brackets.

5. A bed arrangement including a fixed member having a bed alcove therein, a bed foldable endwise to an upright position in said alcove, a pair of brackets at each side of the bed pivotally connected together for mounting the bed in pivotal relation to the alcove, one of said brackets of each pair comprising a member fixed with respect to the alcove and the bracket member pivotally connected thereto comprising a bracket secured to the bed, one of said brackets of each said pair including two parts having opposed rocker bearing surfaces co-acting with each other to provide for relative adjustment therebetween whereby to vary the angular position of the bracket to raise or lower the bed and thereby adjust the vertical position of the bed in said alcove, and means securing together the said two parts of said last-named brackets.

JOSEPH L. BRACK.

REFERENCES CITED

The following references are of record in the file of this patent:

UNITED STATES PATENTS

| Number | Name | Date |
|---|---|---|
| 253,768 | Saxton | Feb. 14, 1882 |
| 298,112 | Nash | May 6, 1884 |
| 365,348 | Muller | June 4, 1887 |
| 402,179 | Muller | Apr. 30, 1889 |
| 461,481 | Kelly | Oct. 20, 1891 |
| 554,653 | Christ | Feb. 18, 1896 |
| 772,006 | Tesch | Oct. 11, 1904 |
| 781,153 | Owen | Jan. 31, 1905 |
| 784,343 | Peace | Mar. 7, 1905 |
| 895,571 | Merrill | Aug. 11, 1908 |
| 956,340 | Haley | Apr. 26, 1910 |
| 1,287,120 | Sinclair | Dec. 10, 1918 |
| 1,609,746 | Vittone | Dec. 7, 1926 |
| 1,880,890 | Dobbs | Oct. 4, 1932 |
| 2,147,011 | Crawford | Feb. 14, 1939 |

Certificate of Correction

Patent No. 2,443,552.   June 15, 1948.

JOSEPH L. BRACK

It is hereby certified that error appears in the printed specification of the above numbered patent requiring correction as follows: Column 7, line 1, for the word "while" read *which*; and that the said Letters Patent should be read with this correction therein that the same may conform to the record of the case in the Patent Office.

Signed and sealed this 19th day of October, A. D. 1948.

[SEAL]

THOMAS F. MURPHY,
*Assistant Commissioner of Patents.* each of the brackets of one of said pairs including two parts having opposed rocker bearing surfaces providing for relative adjustment therebetween whereby to vary the angular position of the brackets and thereby adjust the vertical position of the bed in said alcove, and adjustable means securing together the said two parts of said last-named brackets.

5. A bed arrangement including a fixed member having a bed alcove therein, a bed foldable endwise to an upright position in said alcove, a pair of brackets at each side of the bed pivotally connected together for mounting the bed in pivotal relation to the alcove, one of said brackets of each pair comprising a member fixed with respect to the alcove and the bracket member pivotally connected thereto comprising a bracket secured to the bed, one of said brackets of each said pair including two parts having opposed rocker bearing surfaces co-acting with each other to provide for relative adjustment therebetween whereby to vary the angular position of the bracket to raise or lower the bed and thereby adjust the vertical position of the bed in said alcove, and means securing together the said two parts of said last-named brackets.

JOSEPH L. BRACK.

REFERENCES CITED

The following references are of record in the file of this patent:

UNITED STATES PATENTS

| Number | Name | Date |
|---|---|---|
| 253,768 | Saxton | Feb. 14, 1882 |
| 298,112 | Nash | May 6, 1884 |
| 365,348 | Muller | June 4, 1887 |
| 402,179 | Muller | Apr. 30, 1889 |
| 461,481 | Kelly | Oct. 20, 1891 |
| 554,653 | Christ | Feb. 18, 1896 |
| 772,006 | Tesch | Oct. 11, 1904 |
| 781,153 | Owen | Jan. 31, 1905 |
| 784,343 | Peace | Mar. 7, 1905 |
| 895,571 | Merrill | Aug. 11, 1908 |
| 956,340 | Haley | Apr. 26, 1910 |
| 1,287,120 | Sinclair | Dec. 10, 1918 |
| 1,609,746 | Vittone | Dec. 7, 1926 |
| 1,880,890 | Dobbs | Oct. 4, 1932 |
| 2,147,011 | Crawford | Feb. 14, 1939 |

Certificate of Correction

Patent No. 2,443,552.  June 15, 1948.

JOSEPH L. BRACK

It is hereby certified that error appears in the printed specification of the above numbered patent requiring correction as follows: Column 7, line 1, for the word "while" read *which*; and that the said Letters Patent should be read with this correction therein that the same may conform to the record of the case in the Patent Office.

Signed and sealed this 19th day of October, A. D. 1948.

[SEAL]

THOMAS F. MURPHY,
*Assistant Commissioner of Patents.*